Dec. 5, 1950     R. J. TURMAN     2,532,746
FRAME FOR MODIFYING LAWN MOWERS

Filed Aug. 20, 1948     3 Sheets-Sheet 2

Fig. 2

INVENTOR.
ROSS J. TURMAN
BY
McMorrow, Berman & Davidson
ATTORNEYS

Dec. 5, 1950  R. J. TURMAN  2,532,746
FRAME FOR MODIFYING LAWN MOWERS
Filed Aug. 20, 1948  3 Sheets-Sheet 3

INVENTOR.
ROSS J. TURMAN
BY
McMorrow, Berman & Davidson
ATTORNEYS

Patented Dec. 5, 1950

2,532,746

UNITED STATES PATENT OFFICE 2,532,746

FRAME FOR MODIFYING LAWN MOWERS

Ross J. Turman, Medford, Oreg.

Application August 20, 1948, Serial No. 45,247

2 Claims. (Cl. 56—26)

My invention relates to lawnmowers of the type wherein a reel rotating on a horizontal axis is supported by axially-aligned outboard driving wheels and is adapted to be propelled over the lawn by a rearwardly and upwardly-directed handle. Such lawnmowers have the objectionable feature that the outboard wheels tend to roll downward a strip of grass on the uncut side of the reel, whereby such uncut grass is missed by the reel on the next passage of the lawnmower and which strips of grass thereafter are drawn upwardly by the sun or the natural resiliency of the grass to present an unsightly appearance and require further cutting of the lawn. Also, such standard lawnmowers are not readily adaptable to the addition of a power drive for the same.

With the foregoing in view, it is an object of my invention to provide a frame for modifying a standard lawnmower of the class described to a non-standard lawnmower wherein the driving wheels are rearwardly spaced in inboard relation to the reel.

A further object is to provide such a frame as that last described which includes means for mounting a power drive thereon.

A further object is to provide a frame such as that last described which includes means mounting a clutch for the power drive on the frame.

A further object is to provide an improved frame such as that last described which includes means for adjustably securing the handle to a rear portion of the frame and which includes means for angularly adjusting the handle.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 2 is a plan view thereof, parts being broken away for the sake of clarity;

Figure 4:
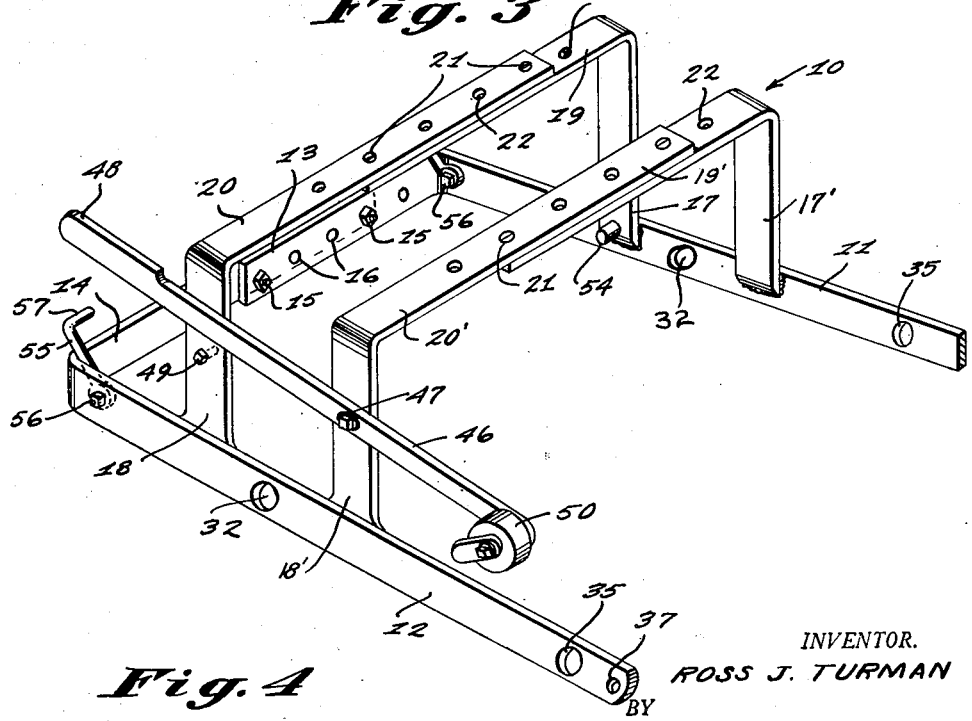
Figure 4 is a perspective view of the frame according to the invention apart from the lawnmower structure, parts being broken away.

Referring specifically to the drawings, wherein like reference characters have been used throughout the several views, to designate like parts, 10 designates a frame according to the invention which is best disclosed in Figure 4. The frame according to the invention includes a pair of elongated side frame members 11 and 12 which include laterally inwardly-directed free ends at the rear thereof comprising cross-frame members 13 and 14, respectively. The cross-frame members 13 and 14 overlap and are adapted to be secured together in adjusted overlapping relation by any suitable means, such as the bolts 15 which pass through selected pairs of spaced holes or the like 16 formed in each cross-frame member 13 and 14, and which holes are adapted to be aligned whereby the side frame members 11 and 12 may be connected together in adjustable, laterally-spaced relation. The side frame member 11 is formed with a pair of spaced uprights 17 and 17' intermediate its ends thereof while the side frame member 12 is formed with a pair of spaced uprights 18 and 18' likewise intermediate its ends thereof. The upright 18 of the frame member 12 is provided with a laterally inwardly directed free end 20 which overlaps the laterally inwardly directed free end 19 of the upright 17 of the frame member 11, the laterally inwardly directed free ends 20 and 19 providing cross frame members. The upright 18' of the frame member 12 is provided with a laterally inwardly directed free end 20' which overlaps the laterally inwardly directed free end 19' of the upright 17' of the frame member 11, the laterally inwardly directed free ends 20' and 19' providing cross frame members. The cross frame members 20 and 19 and 20' and 19' are each connected together by any suitable means, such as cap screws 21 which extend through selected ones of the spaced holes 22 formed through said cross frame members. The uprights 17 and 17' and 18 and 18' and their respective cross frame members 19 and 19' and 20 and 20', form a saddle extending transversely of the side frame members 11 and 12. The purpose of connecting the side frame members 11 and 12 together in adjustable laterally spaced relation is to enable the frame to be applied to any standard lawnmower irrespective of the length of the reel thereof. In practice, the reels come in substantially standard lengths whereby the overlapping of the cross-frame members 13, 14 and 19 and 20 may be such that the side frame members may be disposed to accommodate any standard reel.

Figure 1:
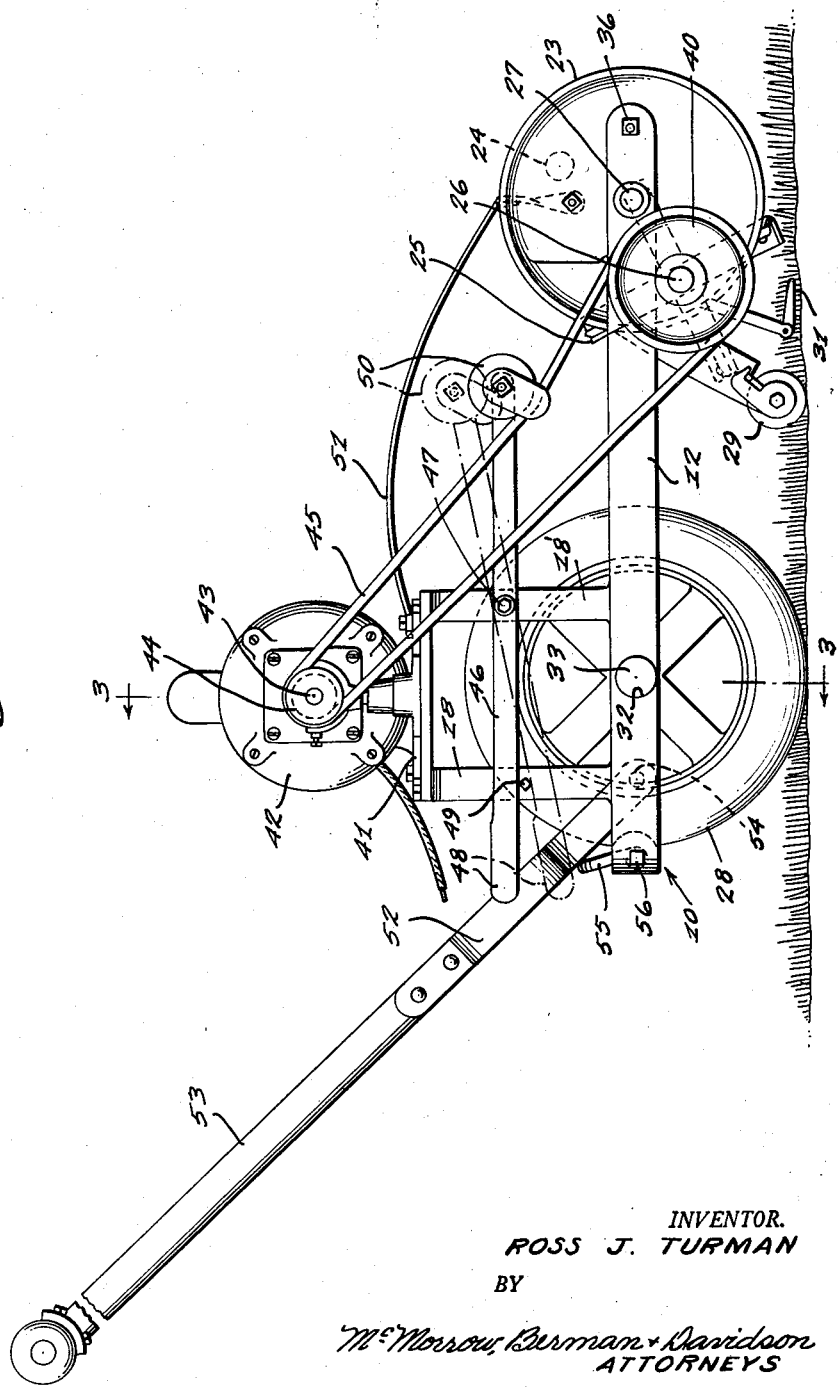
Figure 1 is an elevational view showing the frame according to the invention applied to a standard lawnmower to convert the same to a non-standard lawnmower.
Figure 3:
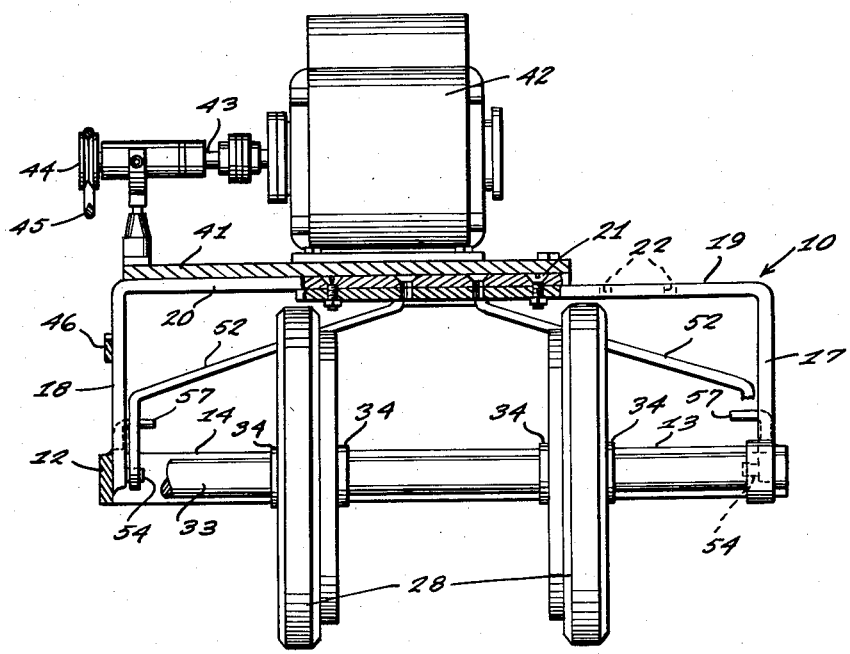
Figure 3 is a transverse vertical sectional view taken substantially on the plane of the line 3—3 of Figure 1.

As best seen in Figures 1 and 2, the lawnmower has a pair of dust caps 23 which are maintained in laterally-spaced relation by an offset crossbar 24 and by a horizontally-rotating reel 25, the axle 26 of which is journaled in the dust caps in offset relation to the axis thereof. Likewise, each dust cap normally includes an axially-disposed and laterally outwardly-directed stub shaft 27. The driving wheels 28 for the lawnmower are normally journaled on the stub shafts 27 so as to drive the reel 25 in any suitable and/or well known manner, as by a pair of ring gears on the wheels 28 engaging pinions, not shown, operatively connected to the reel shaft 26. A ground-engaging roller 29 extends downwardly and rearwardly from the dust caps 23 and supports the assembly against rearward tilting. Likewise, the reel 25 works against a stationary cutter bar extending between the dust caps 23 and which is diagrammatically indicated at 31, Figure 1, and which cooperates with the reel 25 in a well known manner. In the device according to the invention, the side frame members 11 and 12 are provided with laterally-aligned holes 32 providing journals for an axle or shaft 33 which is adapted to span the side frame members 11 and 12 adjacent the rear ends thereof. The shaft 33 is adapted to have the usual lawnmower wheels 28 rotatably secured thereto in any suitable manner between the side frame members 11 and 12, whereby such wheels will be located in inboard relation to the reel 25. Any suitable means, such as the spacer sleeves 34, Figure 3, may be disposed about the shaft 33 to maintain the wheels 28 in a desired relation between the side frame members. The side frame members 11 and 12 are also provided with a pair of laterally-aligned holes 35 adjacent their front ends and which provide journals rotatably receiving the stub shafts 27 of the dust caps 23. To prevent relative rotation of the dust caps on the side frame members, any suitable means such as the bolts 36, are extended through the free ends of the side frame members and through the dust caps 23 to rigidly secure the side frame members and dust caps together.

It follows from the foregoing, and as clearly illustrated in Figure 1, that the assembly just described locates the usual cutting reel and related parts adjacent the forward end of the side frame members 11 and 12 and supported thereby on the roller 29. The rear end of the side frame members 11 and 12 are supported by the wheels 28. Thus, the reel 25 is operatively supported in proper cutting relation to the lawn. However, this assembly provides no means for rotating the reel 25 in view of the fact that such reel is normally rotated by the driving engagement aforesaid with the driving wheels 28. To overcome this difficulty, means now to be described have been provided. Thus, and as best seen in Figure 1, a pulley 40 is fixed to one end of the reel shaft 26 in place of the usual pinion, not shown. Likewise, a motor base plate 41 is secured between the upwardly-offset cross-frame members 19 and 20 in any suitable manner, and has any suitable motor 42 fixed thereto. In the embodiment shown, an electric motor has been disclosed, but it is obvious that a gasoline motor could be substituted. The motor 42 includes a drive shaft 43 having a pulley 44 fixed thereon. A belt 45 operatively connects the pulleys 40 and 44, whereby the reel 25 is operatively coupled to the motor 42 for driving thereby. A clutch lever 46 is pivoted on one of the uprights 18 by any suitable pivot-providing means 47. The clutch lever includes a rear end or pedal 48 which normally rests atop a detent 49 fixed to the other upright 18. However, at times the pedal 48 is adapted to be depressed and engaged below the detent 49, as indicated in broken lines in Figure 1. In this position, the front end of the clutch lever 46 is elevated, whereby a roller 50 rotatable on such front end is elevated out of engagement with the belt 45. The effect of this disengagement of the roller 50 from the belt 45 is to loosen the belt, whereby the same will slip and permit relative rotation of the motor pulley 44 relative to the reel pulley 40. However, when the roller 50 is depressed to the full line position into belt-tightening engagement with the belt 45, the motor 42 and reel 25 are operatively coupled together for rotation as a unit. If desired, a grass shield 51 of any suitable form may be secured to the cross-braces 19 and 20 and to the dust caps 23. The forked front end 52 of the usual lawnmower handle 53 is pivoted to the frame in any suitable manner, as on the laterally inwardly-directed stub shafts 54 secured to the side frame members 11 and 12 in the region of one pair of uprights 16 and 17. The handle 53 is maintained in an angularly-adjusted position relative to the frame 10 by means of a handle-adjusting member 55 which is pivotally and adjustably secured in the rear ends of the side frame members 11 and 12 by any suitable pivoting and adjusting means 56. The members 55 include laterally inwardly-directed free ends 57 upon which the forked lower ends 52 of the handle 53 rest. Thus, by pivoting the members 55 on the pivots 56, the angle of the handle 53 may be increased or decreased relative to the frame 10.

It is to be understood that the particular frame shown and described hereinabove is an example and is susceptible of many obvious modifications.

Thus, while I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. An attachment for a standard lawnmower including a rotatable shaft carrying a cutting reel, said attachment comprising a frame including a pair of longitudinally extending side members arranged in parallel spaced relation with respect to each other, a pair of cross frame members arranged transversely of said side frame members adjacent one of the ends of the latter, each of said cross frame members having one end fixedly secured to said one end of each of said side frame members and having a portion adjacent the other end arranged in abutting overlap relation with respect to the other of said cross frame members, at least a pair of upright members arranged above said side frames and transversely thereof, each of said upright members having its lower end fixedly secured to the adjacent one of said side frame members, a second pair of cross frame members arranged transversely of said frame members adjacent the upper ends of said upright members, each of said second pair of cross frame members having one end fixedly secured to the adjacent one of said upright members, and having a portion adjacent the other end arranged in abutting overlap relation with respect to the other of said cross frame members, means extending through said portions of said first and second named cross frame members for adjustably positioning said side frame member toward and away from each other, whereby the frame can be adjusted to accommodate any size lawnmower, a source of motive power fixedly secured to said second cross frame members, means carried adjacent the other end of said side members for rotatably mounting said shaft carrying the cutting reel, and means operatively connecting said source of power to said rotatable shaft.

2. An attachment for a standard lawnmower including a rotatable shaft carrying a cutting reel, said attachment comprising a frame including a pair of longitudinally extending side frame members arranged in parallel spaced relation with respect to each other, at least two spaced saddle members positioned transversely of said side frame members intermediate the ends thereof and fixedly secured to said side frame members, a stub shaft on one end of each of said side frame members, a dust cap carried by each of said stub shafts, said dust caps being arranged in spaced opposed relation with respect to each other, and means provided on said dust cap for rotatably receiving said shaft carrying the cutting reel.

ROSS J. TURMAN.

REFERENCES CITED

The following references are of record in the file of this patent:

UNITED STATES PATENTS

| Number | Name | Date |
|---|---|---|
| 1,417,485 | Baldwin | May 30, 1922 |
| 2,003,162 | Ulmer | May 28, 1935 |
| 2,133,512 | Herge | Oct. 18, 1938 |
| 2,209,309 | George | July 30, 1940 |
| 2,337,615 | McLaren | Dec. 28, 1943 |
| 2,389,294 | Burke | Nov. 20, 1945 |